(12) United States Patent
Harvey et al.

(10) Patent No.: US 7,516,063 B1
(45) Date of Patent: Apr. 7, 2009

(54) SYSTEM AND METHOD FOR STORING DATA USING A MACHINE READABLE VOCABULARY

(75) Inventors: George Hamilton Harvey, Winchester, NH (US); Suzanne Elizabeth Harvey, Winchester, NH (US)

(73) Assignee: Personalized Mass Media Corporation, New York, NY (US)

( * ) Notice: Subject to any disclaimer, the term of this patent is extended or adjusted under 35 U.S.C. 154(b) by 1575 days.

(21) Appl. No.: 09/835,400

(22) Filed: Apr. 17, 2001

(51) Int. Cl.
*G06F 17/21* (2006.01)
(52) U.S. Cl. ............... 704/10; 707/101; 707/102
(58) Field of Classification Search ............ 704/1, 704/9, 10; 715/531, 532, 533; 707/100, 707/102, 101
See application file for complete search history.

(56) References Cited

U.S. PATENT DOCUMENTS

| | | | |
|---|---|---|---|
| 4,384,329 A * | 5/1983 | Rosenbaum et al. | 704/10 |
| 5,056,021 A | 10/1991 | Ausborn | |
| 5,708,822 A | 1/1998 | Wical | |
| 5,737,732 A * | 4/1998 | Gibson et al. | 707/2 |
| 5,794,050 A | 8/1998 | Dahlgren et al. | |
| 5,838,965 A * | 11/1998 | Kavanagh et al. | 707/103 R |
| 5,873,056 A | 2/1999 | Liddy et al. | |
| 5,995,955 A | 11/1999 | Oatman et al. | |
| 6,026,388 A | 2/2000 | Liddy et al. | |
| 6,101,490 A | 8/2000 | Hatton | |
| 6,233,580 B1 * | 5/2001 | Kaplan et al. | 707/101 |
| 6,332,143 B1 | 12/2001 | Chase | |
| 7,016,905 B2 * | 3/2006 | Murray et al. | 707/100 |
| 2004/0024739 A1 * | 2/2004 | Copperman et al. | 707/1 |

OTHER PUBLICATIONS

PCT-International Search Report dated Aug. 19, 2002, for application No. PCT/US02/11943, filed Apr. 17, 2002.

* cited by examiner

*Primary Examiner*—Patrick N Edouard
*Assistant Examiner*—Lamont M Spooner
(74) *Attorney, Agent, or Firm*—Goodwin Procter, LLP (57) ABSTRACT

A system and method for storing and processing words of a vocabulary that represents all concepts. The words are divided into a number of fields, each field having meaning with respect to the meaning of the word. The fields are stored and processed in a manner that allows the meaning of each field to be recognized by machine. The meanings of each field are processed to interpret the meaning of each word. This vocabulary of words as stored and processed by machine is particularly useful in fields such as artificial intelligence, natural language processing, and database processing.

12 Claims, 6 Drawing Sheets

FIG. 2

0xx. ABSTRACT RELATIONS (Existence)

00x. EXISTENCE
000, Existence
001, Substantiality
002, Intrinsicality
003, Extrinsicality
004, State
005, Circumstance
006, Identity
007, Presence 01x. RELATION
010, Relation
011, Uniformity
012, Agreement
013, Greatness
014, Mixture
015, Simplicity
016, Part
017, List 02x. ORDER
020, Order
021, Sequence
022, Beginning
023, Continuity
024, Generality
025, Particularity
026, Conformity
027, Normality 03x. QUANTITY
030, Quantity
031, Degree
032, Equality
033, Repetition
034, Mean
035, Number
036, Plurality
037, Chance 1xx. SPACE 10x. SPACE
100, Space
101, Region
102, Location
103, Exteriority
104, Centrality
105, Layer
106, Environment
107, Bounds 11x. VERTICALNESS (DIRECTION)
110, Verticalness
111, Horizontalness
112, Penance
113, Support
114, Obliquity
115, Circumscription
116, Side
117, Direction 12x. STRUCTURE
120, Structure
121, Form
122, symmetry
123, Straightness
124, Sharpness
125, Smoothness
126, Opening
127, Circuitousness 13x. STRENGTH (DIMENSION)
130, Strength
131, Size
132, Distance
133, Interval
134, Length
135, Angularity
136, Swiftness
137, Deviation

FIG. 2 cont.

2xx. TIME

20x. TIME
200, Time
201, Season
202, The Present
203, Newness
204, Instantaneousness
205, Earliness
206, Frequency
207, Regularity of Recurrence 21x. MOTION
210, Motion
211, Travel
212, Leading
213, Progression
214, Approach
215, Arrival
216, Inversion
217, Agitation 22x. CHANGE
220, Change
221, Permanence
222, Continuance
223, Stability
224, Cause
225, Interchange
226, Tendency
227, Increase 23x. EVENT
230, Event
231, Operation
232, Productiveness
233, Moderation
234, Transference
235, Retention
236, Reaction
237, Impulse 3xx. LIFE (Agent)

30x. LIFE
300, Life
301, Age
302, Plants
303, Animals
304, Sensation
305, Exertion
306, Reproduction
307, Masculinity 31x. HUMAN
310, Human (Mankind)
311, Peoples
312, Worker, Doer
313, Artist
314, Politician
315, Associate
316, Master
317, Spectator 32x. MACHINE
320, Mechanics
321, Tools and Machinery
322, Vehicle
323, Computers (automation)
324, Electronics
325, Radar and Radiolocators
326, Radio
327, Television 33x. BUSINESS
330, Business
331, Economy
332, Market
333, Money
334, Accounts
335, Divestment
336, Giving
337, Lending

FIG. 2 cont.

4xx. PHYSICS

40x. PHYSICS
400, Physics
401, Atomics
402, Electricity
403, Heat
404, Radiation & Radioactive
405, Light
406, Attraction
407, Leverage 41x. MATTER
410, Materiality
411, Materials
412, Minerals and Metals
413, Moisture
414, Gas
415, Chemicals
416, Inorganic Matter
417, Organic Matter 42x. WEIGHT (ATTRIBUTES)
420, Weight
421, Density
422, Texture
423, Hardness
424, Rarity
425, Visibility
426, Color
427, Variegation 43x. UNIVERSE (GEOGRAPHY)
430, Universe
431, Land
432, Lake
433, Stream
434, marsh
435, Rain
436, Wind
437, Cloud 5xx. THOUGHT 50x. THOUGHT
500, Thought
501, Topic
502, Inquiry
503, Answer
504, Evidence
505, Maxim
506, Comparison
507, Error 51x. KNOWLEDGE
510, Knowledge
511, Idea
512, Truth
513, Probability
514, Certainty
515, Qualification
516, Intellect
517, Memory 52x. JUDGMENT
520, Judgment
521, Discrimination
522, Belief
523, Theory
524, Philosophy
525, Meaning
526, Imagination
527, Sanity 53x. COMMUNICATION
530, Communication
531, Language
532, Information
533, Indication
534, Interpretation
535, Teaching
536, Representation
537, Publication

FIG. 2 cont.

6xx. ATTITUDE

60x. ATTITUDE
600, Mental Attitude
601, Will
602, Intention
603, Motivation
604, Choice
605, Necessity
606, Impulse
607, Carefulness 61x. FASHION
610, Fashion
611, Formality
612, Social Convention
613, Custom
614, Repute
615, Title
616, Courtesy
617, Accord 62x. FEELINGS
620, Feelings
621, Wonder
622, Amusement
623, Hope
624, Pride
625, Kindness
626, Love
627, Pleasantness 63x. BEAUTY
630, Beauty
631, Artlessness
632, Taste
633, Affectation
634, Art
635, Music
636, Poetry
637, Ornamentation 7xx. GOOD (QUALITY)

70x. GOOD
700, Goodness
701, Importance
702, Perfection
703, Cleanness
704, Improvement
705, Preservation
706, Accomplishment
707, Expedience 71x. AUTHORITY
710, Authority
711, Precept
712, Freedom
713, Obedience
714, Compact
715, Security
716, Peace
717, Request 72x. ETHICS
720, Ethics
721, Right
722, duty
723, Virtue
724, Innocence
725, Chastity
726, Temperance
727, Justice 73x. DEITY
730, Deity
731, Religions
732, Scripture
733, Theology
734, Sanctity
735, Nonreligiousness
736, Worship
737, Occultism

FIG. 3

| BASE | ALT | DST | MOD | SRC |
|------|-----|-----|-----|-----|

Computer Programmer:
| | | | | |
|------|------|------|------|------|
| 323 | 312 | 710 | 531 | 510 |
| computer | worker | for authority | by language | based on knowledge |

Computer Hardware Engineer:
| | | | | |
|------|------|------|------|------|
| 323 | 312 | 320 | 000 | 510 |
| computer | worker | for machine | by existence | based on knowledge |

Computer Salesman:
| | | | | |
|------|------|------|------|------|
| 323 | 312 | 335 | 530 | 000 |
| computer | worker | for divestment | by communication | based on existence |

Electronics Engineer:
| | | | | |
|------|------|------|------|------|
| 324 | 312 | 320 | 000 | 510 |
| electronics | worker | for machine | by existence | based on knowledge |

Electronics Teacher:
| | | | | |
|------|------|------|------|------|
| 535 | 312 | 324 | 530 | 510 |
| teaching | worker | for electronics | by communication | based on knowledge |

Teacher:
| | | | | |
|------|------|------|------|------|
| 535 | 315 | 000 | 530 | 510 |
| teaching | worker | for existence | by communication | based on knowledge |

Instructor (including all people who instruct anything):
| | | | | |
|------|------|------|------|------|
| 535 | 315 | 000 | 530 | 000 |
| teaching | human | for existence | by communication | based on existence |

Instructor (possibly including such things as institutions and computer programs):
| | | | | |
|------|------|------|------|------|
| 535 | 300 | 000 | 530 | 000 |
| teaching | life (agent) | for existence | by communication | based on existence |

Instructional Experience:
| | | | | |
|------|------|------|------|------|
| 535 | 230 | 000 | 000 | 000 |
| teaching | event | for existence | by existence | based on existence |

SYSTEM AND METHOD FOR STORING DATA USING A MACHINE READABLE VOCABULARY

FIELD OF THE INVENTION

The present invention relates generally to the storing and processing of non-numerical data in a machine-readable and machine-operable form. More specifically, the invention includes a process and system for storing and processing a vocabulary that represents all concepts in a form in which the meaning of each word is processed and stored by machine.

SUMMARY OF THE INVENTION

The invention provides a system and method for storing and processing words of a vocabulary that is structured to represent all concepts in a manner that the words are easily stored and processed by machine. The words are divided into a number of fields, each field having meaning with respect to the meaning of the word. The fields are stored and processed in a manner that allows the meaning of each field to be recognized by machine. The meanings of each field are processed to interpret the meaning of each word. This vocabulary of words as stored and processed by machine is particularly useful in fields such as artificial intelligence, natural language processing, and database processing.

Each word includes a number of word roots selected from a set of word roots. Each word root is in turn divided into fields, organized from the most to least significant in a manner that imposes a tree-type taxonomy on the word roots. Each field in a word represents a characteristic of that word. The most significant field provides a class for the word root. Successively less significant fields, as they exist, divide the word root into successively less significant subclasses, each a more definite subset of the more significant subclass being divided. The least significant field provides the category, which is a subset of a next more significant subclass. The category is the most finely definite definition normally available in the set of word roots. Each class, subclass, and category has a value unique within its level of definition. A field within the root represents each level of the root taxonomy. The value of the field represents a part of the meaning of the root. The universal set of all concepts is divided into as many subsets as provided at the finest level of division The roots are combined to form words. Each root combined to form a word represents a particular characteristic of the word. Together the meanings of the roots give particular meaning to the word. The roots representing the words each include similar fields representing similar levels of the tree-type taxonomy. Accordingly, all roots can be processed in a similar manner and can be processed in parallel.

The most universal of all concepts is taken as existence. For this reason, all classes are taken as subsets of existence. The first subset of existence is existence itself, as distinct from the other subsets, which are particularities. Similarly, the division of each class produces one subclass which has the same name as the class itself, along with other more particular subsets. This extends to the categories, and so the first category in each subclass has the same name as the subclass itself. Thus, the first category is "Existence" possibly a subset of the subclass of "Existence," and certainly a subset of the class of "Existence."

A word may also contain a field or fields that are not word roots. For example, a field may be composed of bits, each bit indicating the negation of a specific root of the word.

The vocabulary with these properties is versatile in that it enables all concepts to be represented by a series of fields that are easily stored and processed by computer. Each of the fields provides meaning to the concept and can be processed and manipulated to provide the meaning of the concept. The meanings of each root of a word are commonly independent of one another and thus may be processed independently. This independent processing of roots allows for fast processing as well as for subtlety in the definition of the word.

The above properties make the vocabulary particularly useful for machine storage and processing. Each word is easily represented in the number of bits contained by a processor register. A computer programmed to recognize the meaning of words presented in this form is capable of quickly determining the meaning of the word and can determine various nuances in the manner that the roots are combined. The computer can store concepts using this vocabulary that are directly related to the physical world, but independent of existing human languages. For the computer to work, however, a complete taxonomy is unnecessary. The computer can be provided with particular roots at particular levels of definiteness as required by the task the computer is to perform. The computer may also be provided the meaning for particular roots as the computer encounters new roots or determines a need to employ a new root. This versatile vocabulary allows the computer to efficiently process ideas through association.

DETAILED DESCRIPTION OF THE PREFERRED EMBODIMENTS

In the preferred embodiment of the present invention, data is stored in words by a computer. The composition of the words is particularly designed to allow the computer to process and store the words based on the real meaning of the word. The words each represent a concept. The words are represented in digital form as they are intended to be machine read, processed and stored. In the preferred embodiment, a word is represented by a number of bits equal to the number of bits contained in the processor register of a computer used to process the words of the vocabulary.

Figure 1:
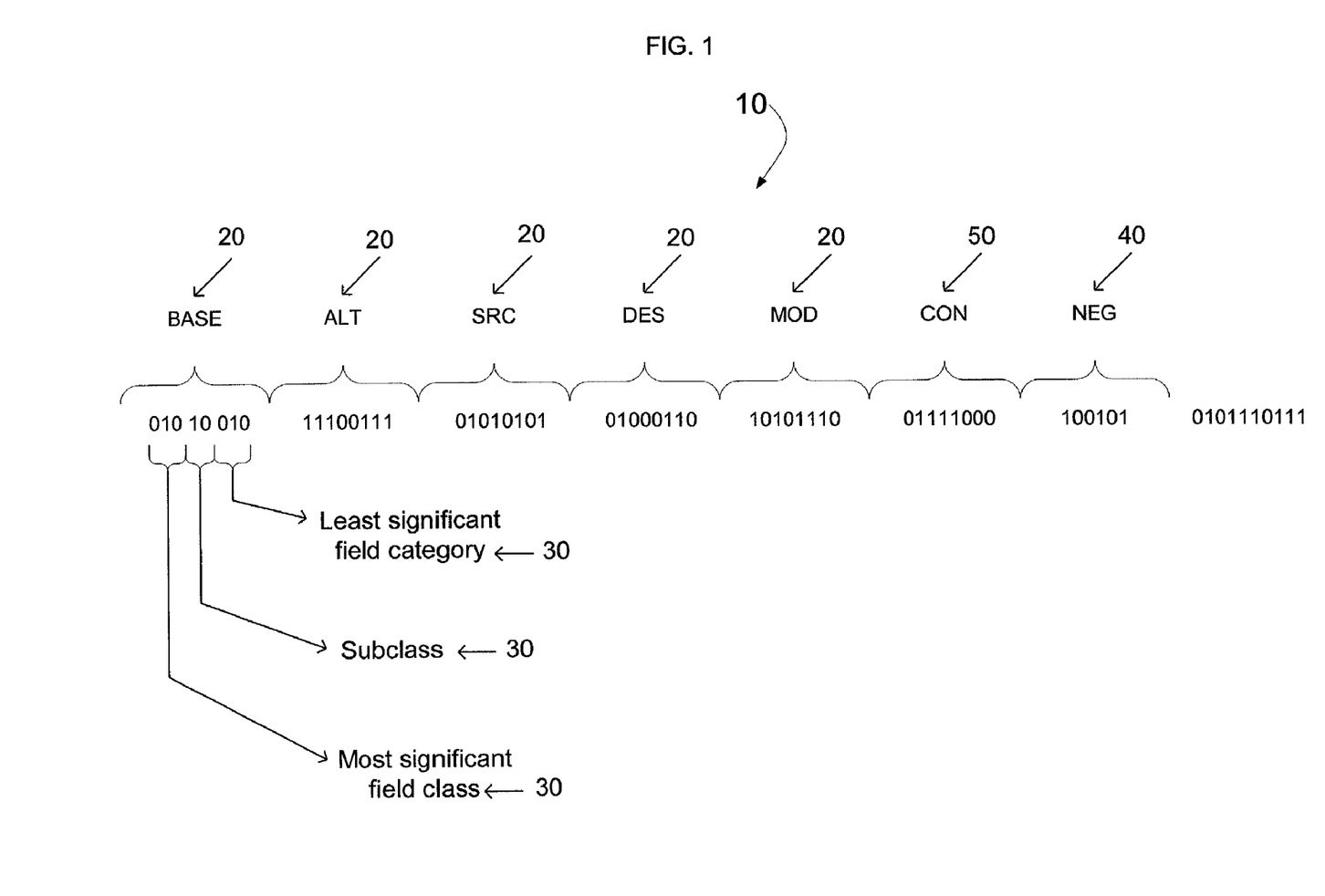
FIG. 1 shows a string of bits representing a word of the vocabulary of the present invention.

An example of a string of bits representing a word of the present invention is shown in FIG. 1. The string 10 representing the word is 64 bits long and is thus designed for particular use with a 64-bit processor. The word includes a number of roots 20. The roots are selected from a set that defines a taxonomy in which the roots have a one-for-one relationship with the bit-structure. The root is divided into fields 30 with each field representing a level of a tree-type taxonomy.

Figure 2:
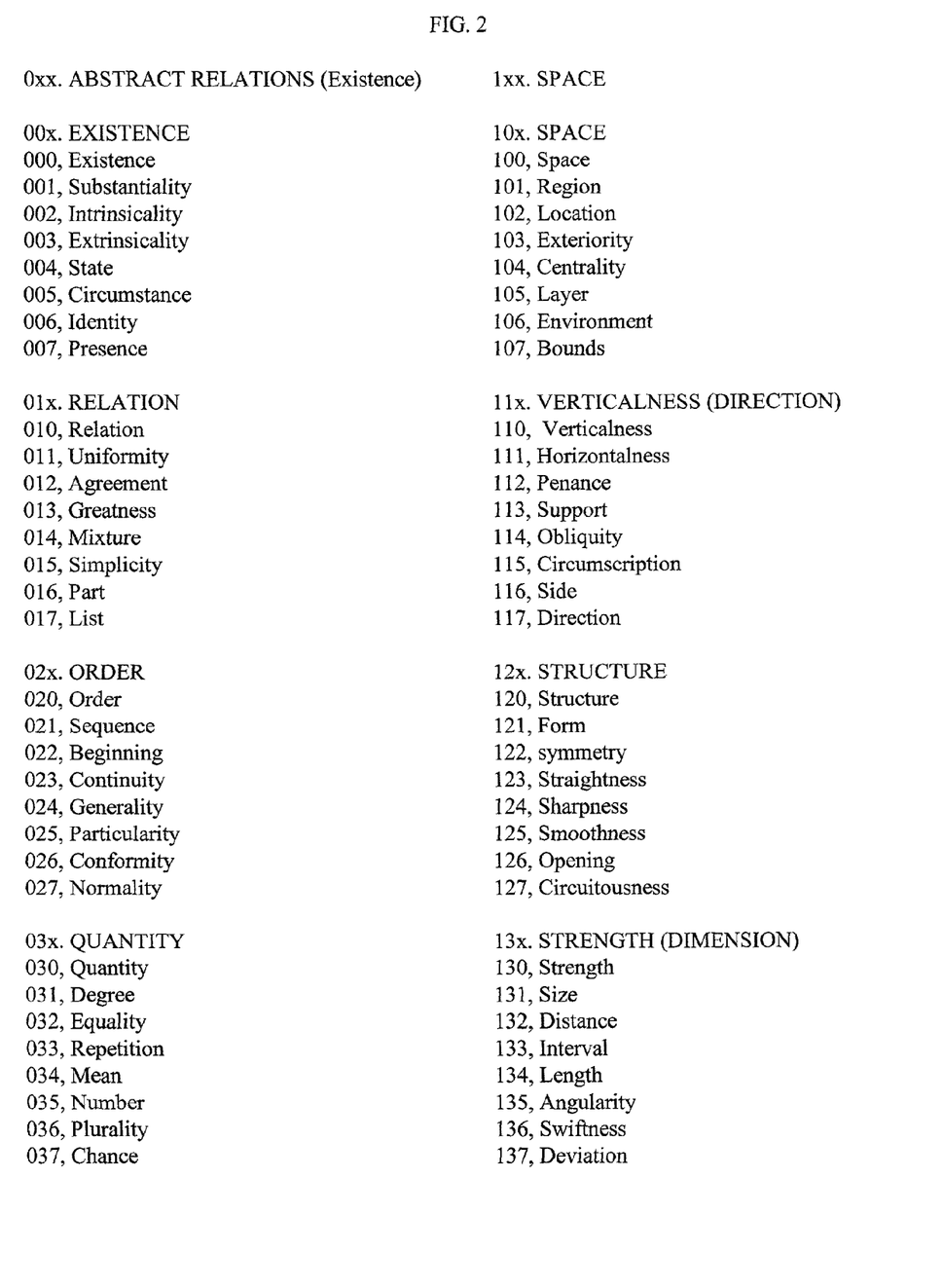
FIG. 2 shows a root taxonomy of the present invention.

The taxonomy used to define roots is shown in FIG. 2. In the taxonomy of the present invention, the most universal concept (taken to be existence) is divided at a highest level into classes. The taxonomy has a tree-type structure that is similar to the tree-type classification system originally used in Roget's Thesaurus. The taxonomy includes a number of levels of significance. In the example, the taxonomy includes three levels: classes, subclasses, and categories. In the example, the taxonomy includes eight classes represented by a field of three bits in a root. These classes are general abstract subsets of the most general concept of existence. Each class is divided into further subsets of subclasses. In the illustrated example, each class is divided into four subclasses. Each subclass is divided into further subsets of categories. In the illustrated example, each class is divided into eight subclasses.

The illustrated taxonomy departs from Roget's system in that the number of branches from one level down to the next is fixed. Each class is divided into four subclasses. Each subclass is divided into eight categories. All concepts fall within a category. To ensure that each concept will fall into a subset at each level, each division includes a broad subset that is similar to the subset of the higher level. For instance as existence is the most universal of concepts, those concepts that do not fall within another class are classified in the class of existence. Under the existence class there is an existence subclass that encompasses all concepts in the existence class that do not fall within the relation, order and quantity subclasses. In a similar manner, there is a life subclass in the life class, a life category in the life subclass, and a human category in the human subclass. Under this system, every concept is assigned a class, a subclass, and a category.

Each root includes one field corresponding to each level of the taxonomy. In the illustrated example, a most significant field of three bits represents the class of the root. A two-bit field represents the subclass. A least significant field of three bits represents the category of the root. Each root in the example is thus represented in eight bits. These three fields are common to each root. The value of each field is directly related to the meaning of the root. In the example, all roots having a value of three in the most significant field are concepts within the life class. Likewise, all of these concepts with a value of one in the subclass are concepts within the human subclass.

The taxonomy described above may be altered in various manners consistent with the present invention. More or less than the three levels of the tree (class, subclass, and category) may be used. Each level of the taxonomy may include a greater or smaller numbers of subsets. However in keeping with the one-to-one relationship between the roots and the bit structure, each subset at one level of the taxonomy is divided by a power of two into the subsets of the next lowest level.

A finite number of roots is defined using this tree-type taxonomy. Roots are combined to define words. Each word includes a certain number of roots. In the illustrated example each word includes five roots. Each root represents a characteristic of the word and is assigned using a defined algorithm. In the illustrated example, the first root, designated the base (BASE), represents the context of the word from the taxonomy described above. The base is the contextual essence of the word. In practice the base root may be determined by looking the word up in a reference of the taxonomy similar to Roget's Thesaurus and finding the class, subclass, and category of the word. The second root is designated the alternate (ALT). The second root supplements the base with another basic component of the word. In practice the alternate root may be determined by looking a word up in dictionary and finding the primary word of the definition and looking that word up in a reference of the taxonomy.

The remaining secondary roots define other characteristics. One root represents the source or cause of the word (SRC). One root represents the destination or purpose of the word (DST). The remaining root represents the mode or method of the word (MOD). Each root provides additional meaning to the word in a subtle and nuanced manner that cannot be accomplished solely by employing the tree-type taxonomy. The tree-type taxonomy provides the basic connection between the field values and specific meanings. However, for each category of the taxonomy to have significant meaning, the meanings are relatively broad. By combining roots in this multidimensional manner, each value for each field has significant meaning. Each root narrows the meaning of each word, yet each root may be processed in a similar manner and in parallel to extract the meaning of the word.

Figure 3:
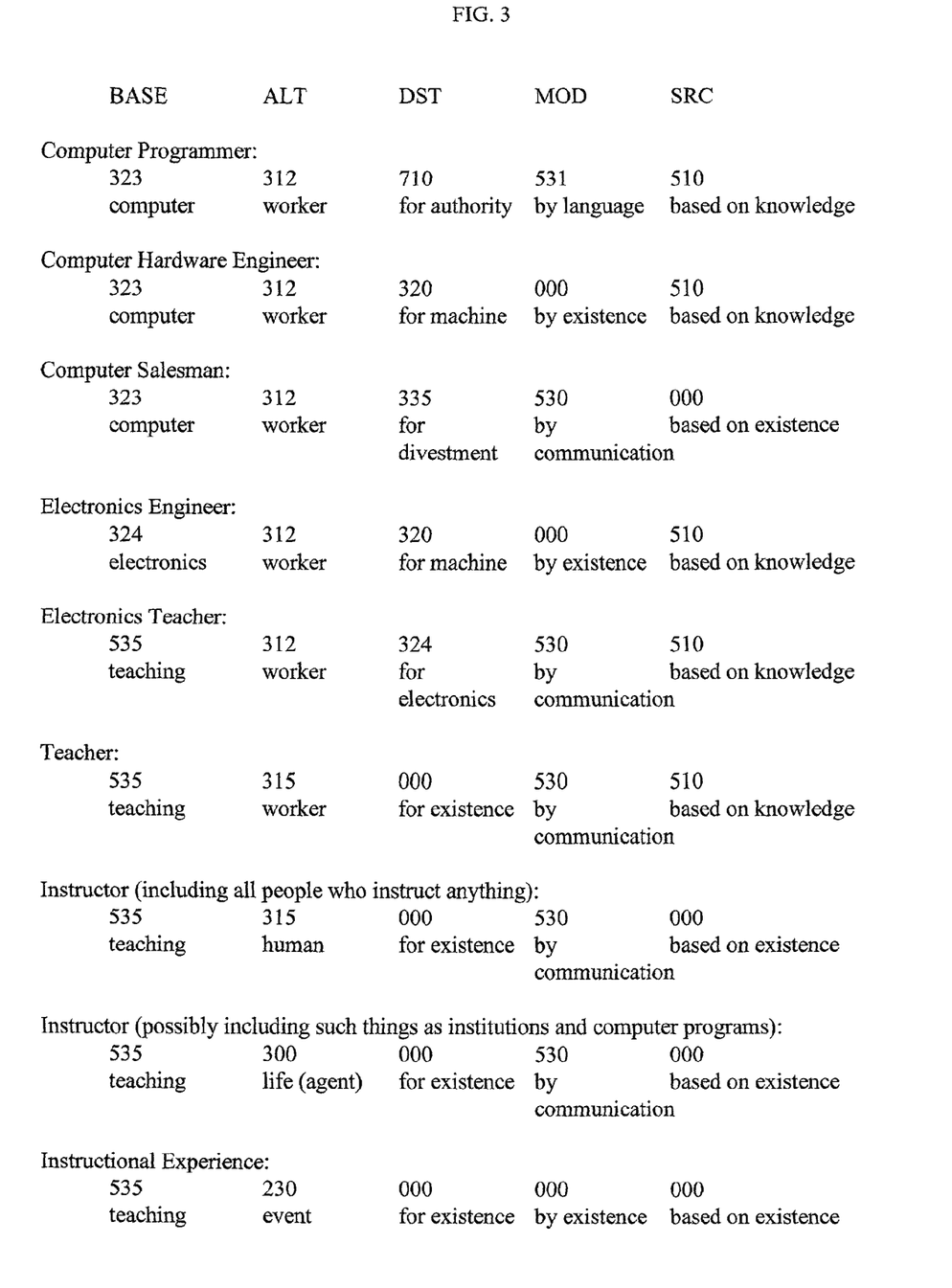
FIG. 3 shows illustrative words at the root level as represented by the present invention.

In FIG. 3, a number of illustrative words are shown. As an example, an "electronics teacher" may be represented by a base root of teaching, an alternate root of worker, a destination or purpose root of electronics, a mode root of communication and a source root of knowledge as shown in FIG. 3. The representations for a number of other words are shown in FIG. 3. It should be noted that merely by looking at the most significant field of the alternate root it can be determined that all the words but "instructional experience" are related, as being in the life class. It can also be determined that by looking at the entire alternate root that the first six words are more closely related, as being in the worker category. Each field can provide meaning to the word. If the field requires no meaning, the value of most general concept "existence" is used in the field. A computer can process and store each word based on the meaning provided by any field or any combination of fields.

For words that are particularly susceptible to classification, certain roots may be conventionalized. For example, "cat" may be represented by ALT root of animal. Using process discussed above, the base root would also be animal. As this combination provides little information and would be similar for all animals, the base root may be conventionalized. By convention, invertebrates are assigned the class value normally indicating space. Vertebrates are assigned class value normally indicating physics. Cold-blooded vertebrates will be assigned the subclass value normally indicating geography, while warm-blooded vertebrates are assigned the subclass value indicating weight. Fish are assigned the category value of lake. Amphibians are assigned the category value of marsh. Reptiles are assigned the category value of land. Birds are assigned the category value of rarity. And mammals are assigned the category value of density. The conventionalized roots are useful where the computer can easily determine meaning from the field values under the convention. These conventions are thus used where the word is better defined by further classification rather than by the standard characteristics represented by the roots. The conventions are also chosen in concert with the taxonomy so that the taxonomy may continue to provide some relationships. For instance, fish are assigned the category value of lake, while amphibians are assigned the category value of marsh. The conventions must conform to the tree-type taxonomy structure. The conventions merely indicate altered meanings of the values of the fields of the roots. The conventions thus use the class, subclass, and category fields that make up each root in a modified manner.

In addition to conventionalizing some roots, the secondary roots may define alternative characteristics for some alternate values or some alternate and base combinations. In this example, the secondary roots define alternative characteristics when the alternate root has the value that indicates animal. The source root indicates where the animal lives. The mode root indicates what the animal eats. The destination root indicates the value of the animal to humans. In the example, "cat" has a source root value indicating land, and mode root value indicating animal, and a destination value of associate (which by convention is used to indicate pet).

Each word is comprised of roots that provide meaning to the words. The words may also include other indicators that supplement or alter the meaning of the roots. In the example of FIG. 1, the word includes 64 bits. The word in the example also includes six negation bits 40. These indicators are used to designate whether each root should be negated or interpreted with an opposite meaning. Other bits in the word are used by convention where required. In this example, "cat" has five roots. The alternate value indicates that it is an animal and that the base root is conventionalized and the secondary roots have alternate meaning. The base value indicates a mammal. The secondary roots indicate that it is a land dwelling, carnivorous pet. In the case the five roots do not distinguish between a cat and a dog. By convention three further bits are used to indicate the type of carnivorous pet. Values of zero for general (unknown or other), one for cat, two for dog, etc. are assigned. The remaining eight bits may be used to further define the word where necessary. In this example, other bits could be used to indicate the weight or the breed of the cat.

The word may also include a connotative root 50 that indicates not further meaning of the word, but rather how the word is used. This connotative root 50 provides nuance of usage and indicates when the word is appropriate to use. The connotative root 50 does not have usefulness in the absence of human language. To give the computer an ability to understand such things as humor, anger, and attempts to be polite or insulting, the values of the connotative root are used. The connotative value indicates which human language word should be selected when human language words have similar meaning. For instance, certain values of the connotative root will indicate whether a word is slang, vulgar, formal, or technical. Thus, given the concept of a burp, the computer is able to select between the English choices of "burp", "belch", or "eructation". With proper connotative values considered in the translation to English, "burp" is used in polite company, "belch" in crude usage, and "eructation" for medical usage. Similarly, an operator may tell the computer, "You have an obsolete processor and faulty memory" or the operator may say, "You are a dolt and a bubble-brain." Through the application of the connotative root, the computer is able to discern the insult in the later statement, but fail to see it in the former.

The vocabulary of this invention is easily processed and stored by computer. As previously described the computer should include a processor having a register for receiving the number of bits forming each word. Words matched to the processor in this manner are completely manipulated in a single cycle resulting in efficient processing. The words may also be transferred from memory or other storage media over data busses that transmit an entire word in one cycle. The vocabulary is formed of words represented in digital form and having a length chosen as the number of bits in the register of the processor. Each word has a similar form. In the preferred embodiment the words each include five eight-bit definition roots, an eight bit connotative root, six one bit negation indicators, and a further ten bits used for other indicators. To process these words the computer uses a relatively simple algorithm. In the preferred embodiment, the computer receives all of the bits of a word in a register of a processor.

The processor is programmed to recognize the bits that comprise each field of the word. The computer initially processes the alternate root. Each root is processed in a similar manner. The value of the most significant field is determined, thus giving broad meaning to the root. The values of the other fields are determined down to the least significant field. Each value provides a narrower meaning of the root. The computer is programmed with the root taxonomy necessary to recognize the meaning of each field value. The computer is also programmed with algorithms to recognize the conventions applied to any words that the computer will use. However, regardless of any convention, each root contains the same fields. The computer may identify the field of each root using the same process. The computer is programmed to initially determine the meaning of the alternate root. The meaning of the base root is determined taking into account any conventions based on the alternate root. The meaning of the secondary roots are determined taking into account any conventions or alternate definitions based on the base and alternate roots. The computer then recognizes any adjustments or supplements to the meaning based upon the additional indicators.

The computer may form and store words by using a similar algorithm. The computer in order to form and store a word first determines the alternate root. The basic component of the definition of the word is looked up in the root taxonomy to determine the alternate root. The field values for the class, subclass, and category of the alternate root are determined. The values of the remaining fields are determined by referencing the standard root taxonomy unless the alternate root indicates conventionalized values. The base root is determined in a similar manner based upon the basic context of the word from the root taxonomy. The other roots values are determined based upon characteristic of the root as found in the root taxonomy. The computer is programmed to look to the specific conventions in lieu of the standard root taxonomy based on the value of the alternate root or the base root where appropriate. The field values are selected from the root taxonomy to describe the characteristic of the word define by the root. The process is altered to use specific conventions or to define alternative characteristics based upon the base and alternate root values. The resulting word is digital information that is the computer is able to process and store by conventional methods. The computer can cause words of this invention to be stored in conventional readable media including electronic media such as memory or magnetic media such as disks and tape.

Other embodiments, uses and advantages of the present invention will be apparent to those skilled in the art from consideration of the specification and practice of the invention disclosed. The specification and examples are exemplary. The scope of the invention is set forth by the following claims.

We claim:

1. A method of representing data comprising:

representing each root of a set of roots with a value based on a definitional tree-type structure, each root including a plurality of common fields representing levels of the tree-type structure, each specific field included in a specific root having a value corresponding to the meaning of the specific root at a level of the tree-type structure represented by the specific field;

representing a data concept by grouping a plurality of roots selected from the set of roots to form a word, each root of the plurality of roots corresponding to a characteristic of the data concept represented by the word; and storing the word.

2. The method of claim 1 wherein each word includes a number of bits equal to a number of bits contained in a processor register of a computer for processing the word, each field of the plurality of common fields associated with at least one bit.

3. The method of claim 1 wherein a value of a field at each level of the tree-type structure designates a meaning of each value of a higher level of the tree-type structure.

4. The method of claim 1 wherein certain roots are conventionalized based on values assigned to more basic roots, conventionalized roots being assigned field values based on a predetermined convention.

5. The method of claim 1 wherein a characteristic designated by certain roots is defined based on values assigned to more basic roots.

6. The method of claim 1 wherein the word includes a negation bit associated with a particular root, a value assigned to the negation bit designating that the meaning of the particular root is opposite to the meaning assigned to that value in the tree-type structure.

7. The method of claim 1 wherein the word includes a connotative root that indicates how the word is used.

8. A method for storing data comprising:
   forming a tree-type taxonomy for word roots, the upper level of the taxonomy divided into a plurality of classes, each class divided into a plurality of subclasses at a lower level of the taxonomy, each level of the taxonomy represented by a field in each word root;
   combining a plurality of the word roots to form a word, each word root forming the word representing a characteristic of the word; and
   storing the word.

9. The method of claim 8 wherein taxonomy for word roots includes conventions whereby the class and subclasses represented by fields of a word root are altered based on the fields of other word roots combined with the word root to form the word.

10. The method of claim 8 wherein the characteristic represented by at least one root combined to form the word is designated by reference to another root combined to form the word.

11. The method of claim 8 wherein the step of combining includes combining a series of negation bits with the word roots to form the word, the negation bits indicating whether each root is interpreted in the negative.

12. The method of claim 8 wherein the step of combining includes combing a further root with the plurality of the word roots, the further root representing how the word is used.

* * * * *